Oct. 14, 1947.  H. FRIEDMAN  2,428,796
METHOD OF MEASURING THE THICKNESS OF THIN COATINGS
Filed Sept. 8, 1944  2 Sheets-Sheet 1

Inventor
HERBERT FRIEDMAN

By
Attorney

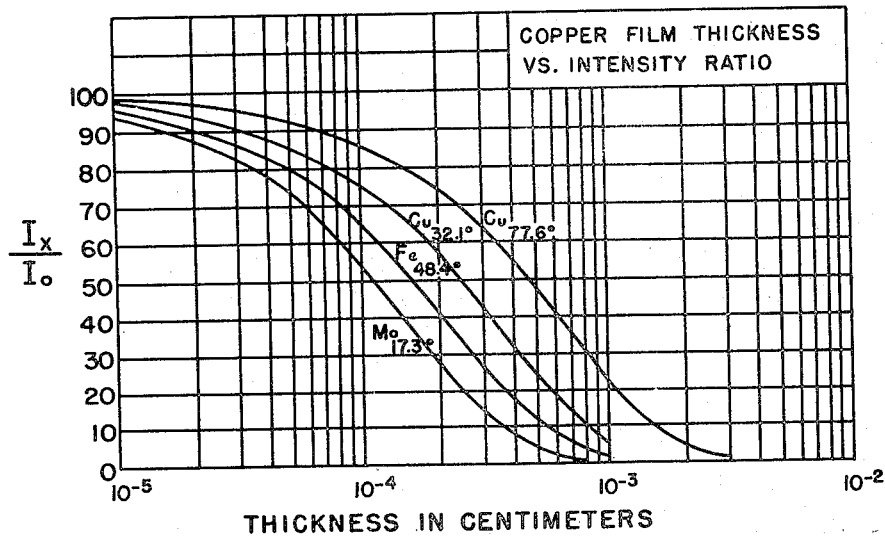
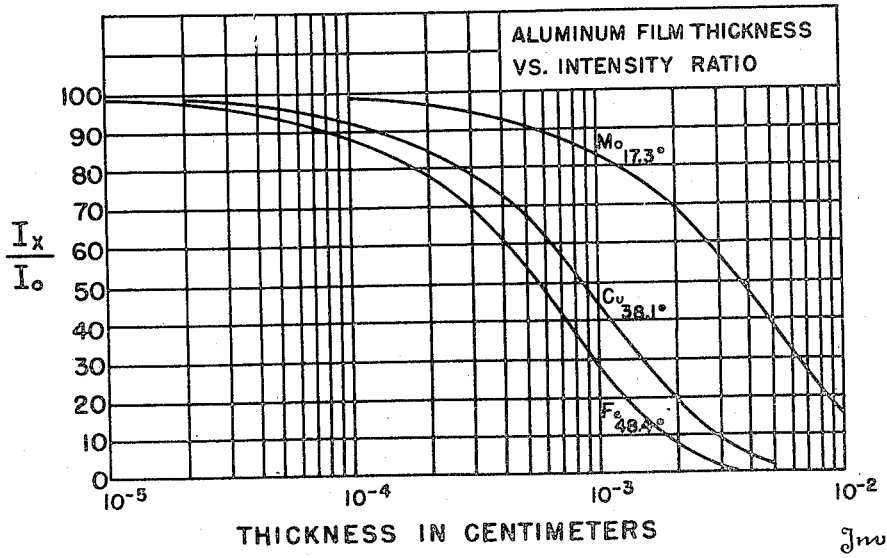

Patented Oct. 14, 1947

2,428,796

UNITED STATES PATENT OFFICE 2,428,796

METHOD OF MEASURING THE THICKNESS OF THIN COATINGS

Herbert Friedman, Arlington, Va.

Application September 8, 1944, Serial No. 553,262

14 Claims. (Cl. 250—83)

(Granted under the act of March 3, 1883, as amended April 30, 1928; 370 O. G. 757)

My invention relates to the measurement of small dimensions and particularly to the non-destructive measurement of the thickness of thin coatings deposited on crystalline backing materials.

In the past many methods have been devised for the estimation of the thicknesses of thin coatings deposited on materials, for example, the thickness of a plated metal coating on a base metal. These methods of film thickness measurement involve, generally, chemical stripping of the film from the surface by means of standard chemical solutions, micrometric measurements and magnetic measurements. However, most of these methods involve the destruction of the sample tested and merely give an indirect measure or estimate of the thickness of a similar coating deposited on a similar material under conditions comparable to those under which the coating was deposited on the sample tested.

It has long been recognized in the electroplating art that a non-destructive rapid method of measuring plating thicknesses would be of great value. More recently considerable interest has been shown by the paint industry in the study of the thickness of paint films and consequently in the nature of the surfaces of pigment particles. Also, recently, the manufacture of ultra-high frequency radio parts and equipment has intensified the need for a rapid, non-destructive method for measuring thicknesses of films in the form of sputtered gold and silver and other coatings on various items.

It is the principal object of my invention to provide a non-destructive method of measuring the thickness of thin coatings, metallic or non-metallic, on crystalline backings to a degree of precision hitherto unattainable.

A secondary object of my invention is to make possible such film thickness measurements from one side of the coated surface.

Another object of my invention is to provide for the measurement of the individual thicknesses of several different superimposed coatings on a given backing material.

A further object of my invention is to provide for the measurement of coating thicknesses over areas as large as one square inch or as small as one square millimeter.

A still further object of my invention is to provide for the measurement of the thickness of a coating on a surface of any shape whatever.

Another additional object of my invention resides in the provision of a method of measuring the thickness of a coating on finely divided materials such as pigments or other finely divided powders.

A further additional object of my invention is to provide for the precise measurement of the thicknesses of thin metal foils.

Further objects and advantages of my invention will in part be obvious and in part appear hereinafter.

My invention comprises the method of measuring film thicknesses by measuring the X-ray diffraction pattern intensity of a material on which the film is applied and comparing its intensity with that of the backing material alone and thus obtaining an extremely precise estimate of the thickness of the film. The method of practicing my invention will be described in detail in the following paragraphs taken in conjunction with the accompanying drawings, of which:

Figures 3 and 4 are sample calibration curves by means of which intensity ratios of diffraction patterns can be converted into film thicknesses with X-rays of various wavelengths. The curves apply to copper and aluminum films respectively.

Thickness measurements made by determination of X-ray transmission through materials are based on the exponential absorption law $$I_x/I_0 = \epsilon^{-\mu\rho x}$$

in which $I_x$ is the transmitted intensity, $I_0$ the initial intensity, $\mu$ the mass absorption coefficient, $\rho$ the density of the material irradiated and $x$ the thickness of the irradiated material. For most materials the mass absorption coefficient $\mu$ and the density $\rho$ are known or are readily measured. The ratio of transmitted to incident intensity, $I_x/I_0$, may be measured photographically, by means of an ionization chamber or by means of a Geiger-Muller counter and appropriate measuring circuit. Reliable results using this technique are obtainable for coating thicknesses varying from a few thousandths of a hundred thousandth of a centimeter to thicknesses as great as several inches depending upon the hardness or softness of the X-rays used.

In order to measure X-ray transmission from one side of a specimen, the beam of radiation must be reflected from the backing material. All crystalline materials reflect monochromatic X- rays coherently at specific angles given by the Bragg diffraction formula, $$n\lambda = 2d \sin \theta$$

in which $\lambda$ is the X-ray wavelength, $d$ the crystalline spacing giving rise to a reflection at the angle $\theta$ and $n$ is the order of the diffraction. Every crystalline material has a unique set of planar spacings, $d_{hkl}$ and associated reflection angles $\theta_{hkl}$.

Figure 1:
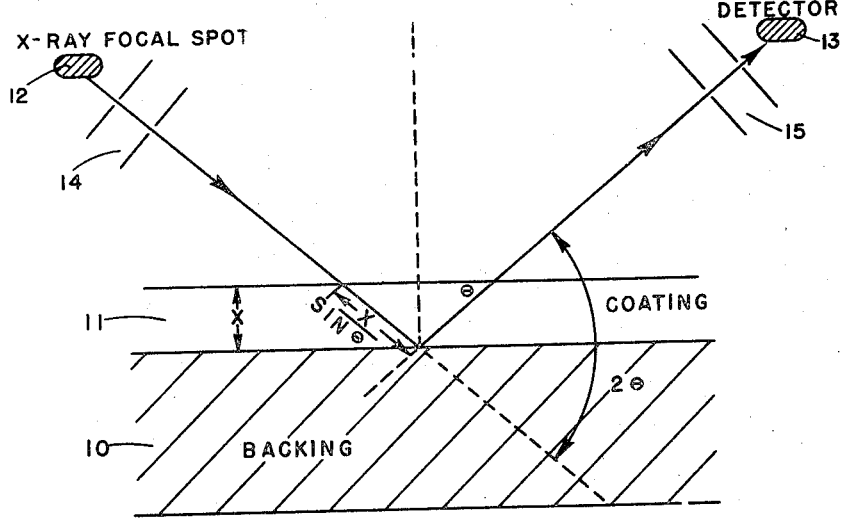
Figure 1 is a diagrammatic sketch of the arrangement of an X-ray source, specimen and detector illustrating the inter relationship of parts of apparatus used in taking X-ray diffraction patterns.

My method of measuring the thickness of a coating deposited on a crystalline backing can be more clearly understood by a consideration of the above theoretical basis therefor in conjunction with the drawings. Referring to Figure 1, in which the conventional apparatus arrangement for taking an X-ray diffration pattern is illustrated, 10 is a crystalline backing material, 11 a coating on it, 12 an X-ray source, 13 an X-ray detector. By means of collimators 14 and 15 the specimen is exposed to a beam of parallel X-rays, and a beam of parallel rays is detected. If $I_0$ is the intensity of the radiation reflected from the uncoated backing material, the ratio $I_x/I_0$ is given as follows:

$$\frac{I_x}{I_0} = \epsilon^{-\mu_c \rho_c \frac{2X_c}{\sin \theta}}$$

in which $\mu_c$ is the mass absorption coefficient of the coating material, $\rho_c$ is the density of the coating material, $X_c$ is the thickness of the coating, and $\theta$ is the characteristic angle of reflection of the X-rays from the backing material. If the ratio of $I_x/I_0$ is determined, $X_c$ can be readily computed. In determining the value of $I_x/I_0$ and, thus, a coating thickness, it is desirable first to measure $I_0$ for the uncoated specimen, coat it, replace it in the diffraction apparatus, and measure $I_x$. If it is impossible to measure $I_0$ on the uncoated specimen, a corresponding measurement made on an uncoated specimen of the same composition will give a ratio which will in turn give a reliable measurement of the coating thickness.

Figure 2:
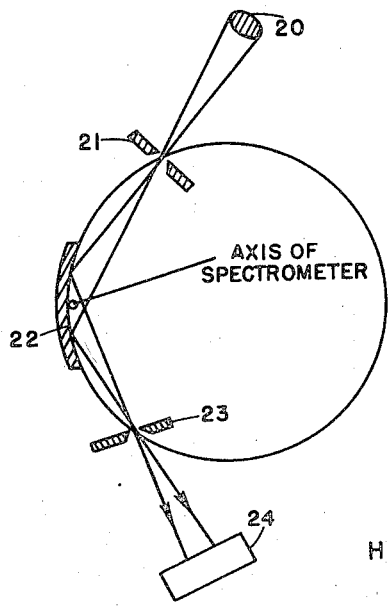
Figure 2 is a diagrammatic representation of a novel method of placing a coated specimen in an X-ray spectrometer according to the principle of my invention.

In Figure 2, I have illustrated a method of mounting a specimen in a spectrometer in a manner such that diffraction patterns of much improved intensity can be obtained therefrom. This is based upon the theorem of plane geometry that all angles inscribed in a chord of a circle are equal. In the figure, 20 represents the source of the X-rays, 21 a slit, 22 the specimen being examined, 23 a second slit and 24 a detector. The three points 21, the spectrometer axis, and 24 constitute three points through which a circle can be drawn. Of these points, 21 and 22 remain fixed and 24 varies in position as the diffraction pattern of the specimen is scanned. Nevertheless, no matter what position 24 takes, a circle can be drawn through all three points. It is apparent that if a scanning of a diffraction pattern by varying the position of 24 through a 90° arc be accomplished a large number of circles can be drawn through the series of three points, one for each position of 24. It should be noted that the specimen is mounted at the axis of the spectrometer, and is exposed to a divergent beam of X-rays. The detector 24 is moved in an arc of a circle about the axis of the spectrometer to detect the lines of the X-ray diffraction pattern. If the radius of the circle defined by the points 21, the spectrometer axis and 24 is large compared to the width of the specimen, the specimen, without appreciable error, can be said to conform to an arc of the circle and all radiation striking it will be focused at a point on the arc of the circle in which the detector moves. In this manner, the detector is exposed to an intensified diffraction pattern of the specimen.

In Figures 3 and 4 there are shown calibration curves for estimating the thicknesses of copper and aluminum films respectively on a silver backing. To use the curves, all that is necessary is to know the wavelength of the X-rays or the target material of the tube, the nature of the coating and the ratio of the transmitted to the incident radiation. The curves are plotted with the ratio of transmitted to incident intensity as a function of coating thickness using the X-ray tube targets and angles noted on the curves. Similar curves can be prepared for films of any material deposited on any crystalline backing material. It is evident that by selection of an appropriate X-ray tube target and angle, film thickness measurements can be made using the mid portions of the curves where the slopes are best adapted to precise readings.

When it is desired to measure the individual thicknesses of several coatings deposited on a crystalline backing, as, for example, the individual thicknesses of the copper, nickel, and chromium layers on a so-called chromium plated article, the following technique can be employed: The ratio of transmitted to incident intensity is measured and the equations:

$$\frac{I_x}{I_0} = (\epsilon^{-\mu_1 \rho_1 X})(\epsilon^{-\mu_2 \rho_2 X})$$
$$= \epsilon^{-(\mu_1 \rho_1 + \mu_2 \rho_2)X}$$

and $$\frac{\rho_1}{\rho_2} = \frac{N_1}{N_2} \quad \text{and} \quad \rho_1 + \rho_2 = \rho$$

are solved for the thickness of the top layer. In the equations the symbols are defined as follows:

The symbols have the meanings given above, but the subscripts refer to the top and underlying coatings respectively. The symbols $N_1$ and $N_2$ represent the atomic weights of the elements referred to by the subscripts.

A second solution to obtain the sum of the top and immediately underlying layer is made, the equations are solved a third time to obtain the sums of the top layer plus the two layers underlying it. The solutions are repeated until the thickness of each individual layer has been determined. If the backing surface is rough but not so rough as to permit undercutting by the coating, the mass of the coating per unit area is obtained by the solving for $\rho x$.

When it is desired to measure the thickness of non-metallic coatings, a two-element compound is treated as two superimposed monatomic structures. Density absorped coefficients can be assigned individually to the several elements forming the compound. For example, if a compound having a general formula AB and having a density, $\rho$, in which the atomic weights of the elements comprising the compound are $N_A$ and $N_B$ the following relationships will hold:

$$\frac{\rho_A}{\rho_B} = \frac{N_A}{N_B}$$

and $$\rho_A + \rho_B = \rho$$

from which $\rho_A$ and $\rho_B$ can be computed. The measured ratio $I_x/I_0$ is then expressed by $$\frac{I_x}{I_0} = (\epsilon^{-\mu_A \rho_A X})(\epsilon^{-\mu_B \rho_B X})$$
$$= \epsilon^{-(\mu_A \rho_A + \mu_B \rho_B)X}$$

in which X is the thickness of the compound layer. The extension of the treatment to more than two components follows in similar manner.

If it is desired to measure the thickness of coating material on a finely divided substance, for example, the thickness of an oxide coating on a metal powder a combination of the above techniques with a measurement of the particle diameter of the powder will yield reliable results.

This technique for measuring films, as can be seen, is applicable to measurement of the thickness of electroplated deposits, oxide films on metal surfaces, oxide films on finely divided metals or materials, sputtered metal coatings on materials such as are commonly found in modern ultra high frequency electrical parts and metal foils. The thicknesses of foils are commonly measured by transmission methods, but, by laying the foil on a crystalline backing and taking a diffraction pattern as pointed out above, the precision of the measurement is much improved for a double absorption occurs in the foil and no difficulty is experienced in orienting the foil with respect to the X-ray beam.

It is not necessary that the specimen be plane in order to measure coating thickness. By reducing the area of the specimen exposed to the beam, the specimen, regardless of curvature can be made to approximate the arc of the circle defined in Figure 2. I have found that precise measurements of coating thickness can be made on areas as small as one square millimeter.

The diffraction pattern can be taken by means of standard X-ray diffraction apparatus and the intensity of the pattern can be measured with standard photographic apparatus. However, a great deal of time can be saved by using a Geiger Muller tube as the detector of the pattern. When using a Geiger Muller tube as a detector, any degree of precision in the intensity measurement can be attained by extending the time of measurement, i. e., the number of counts. Using the Geiger Muller detector the time consumed in making the necessary measurements is counted in minutes for a single strong line of the diffraction pattern can be selected for the intensity measurements.

It is incorrect to assume that $I_x$ in the equations is made up entirely of $K\alpha$ radiation transmitted through the layer. If any material is irradiated with X-rays harder than the minimum required to ionize the K shell, the entire fluorescent X-ray spectrum is excited. Even if the $K\alpha$ radiation of the target employed is softer than the radiation required to excite fluorescence, there are always present in the continuous spectrum X-rays of much shorter wavelength than the $K\alpha$ lines. Fluorescent rays excited by the high energy end of the continuous spectrum and general scattering contribute an appreciable background radiation. The influence of background radiation on measurement of thickness by the method described above may be considerably reduced by the use of suitable filters or almost completely removed by means of a crystal monochromator, but this latter step is generally unnecessary. The coherent reflection from reasonably well formed crystalline materials is limited to an angular range less than one degree in $2\theta$. A measurement of intensity of the background radiation away from this line, gives the extra intensity due to general and fluorescent scattering. Subtracting this background from the total intensity measured at the Bragg angle leaves only the intensity truly transmitted through the thin layer.

The advantages of my method of measuring film thicknesses can be summarized as follows:

Standard X-ray diffraction apparatus can be used;

Specimens of any shape can be used;

Measurement can be made on finely divided materials;

The coating thickness measurement is nondestructive;

Individual thicknesses of superimposed coatings can be measured;

Thicknesses of metallic and non-metallic coatings can be measured equally well;

The radiation intensity measurement is helped by a double absorption of radiation occurring in the coating, once before and once after reflection from the backing material;

By using a specimen of relatively large area and a divergent beam of X-rays, a diffraction pattern of improved intensity can be obtained with resultant improved precision in the measurement.

From the foregoing, the method of practicing my invention will be fully understood, but it is to be understood that the invention is not restricted to the present disclosure to any extent otherwise than restricted by the manner in which such invention is claimed.

The invention described herein may be manufactured and used by or for the Government of the United States of America for governmental purposes without the payment of any royalties thereon or therefor.

Having described my invention, what I claim as new and wish to secure by Letters Patent is:

1. The method of measuring the thickness of a coating on a crystalline material comprising directing a beam of X-rays onto said coated material, intercepting rays comprising lines of the diffraction pattern of the crystalline material and determining their intensity as compared with the intensity of similar lines from the uncoated crystalline material.

2. The method of measuring the thickness of a coating on a crystalline material comprising directing a beam of X-rays of known intensity onto said material, intercepting rays comprising lines of the diffraction pattern of the crystalline material and determining their intensity as compared with the intensity of similar lines obtained from the uncoated material.

3. The method of measuring the thickness of a coating on a crystalline material comprising directing a beam of X-rays onto said material, intercepting and determining the intensity of lines of the diffraction pattern of the said crystalline material, comparing said line intensity with the intensity of corresponding lines from the uncoated material, and thus obtaining a measure of the coating thickness.

4. The method of measuring the thickness of a coating on a surface of crystalline material from one side thereof which comprises directing a beam of X-rays onto said surface and determining from the same side of said surface the intensity of lines of the diffraction pattern of the said crystalline material as compared with the intensity of like lines obtained from the uncoated material.

5. The method of measuring the thickness of a coating on a crystalline material comprising directing a beam of X-rays onto said coated surface, at an acute angle thereto, intercepting rays comprising lines of the diffraction pattern of the crystalline material and comparing their intensity with the intensity of corresponding lines obtained from the uncoated material, thereby obtaining a measure of the coating thickness.

6. The method of measuring the thickness of a metallic coating on a surface of crystalline material from one side thereof, which comprises directing a divergent beam of X-rays onto said surface and determining from the same side thereof the intensity of lines of the diffraction pattern of the said crystalline material as compared with the intensity of like lines obtained from the uncoated material.

7. The method of measuring the thickness of foil comprising backing said foil with a crystalline material, directing a beam of X-rays onto said backed foil, intercepting and determining the intensity of lines of the diffraction pattern of the backing material, comparing the intensity thereof with similar lines from the backing material alone and thus obtaining a measure of the thickness of the foil.

8. The method of measuring the thickness of an electrodeposited metallic coating on a crystalline material from one side thereof comprising directing a beam of X-rays onto said surface and determining from the same side thereof the intensity of lines of the diffraction pattern of the said crystalline material as compared with the intensity of like lines obtained from the uncoated material.

9. The method of measuring the thickness of a coating on a crystalline material comprising directing a beam of X-rays onto said coated material, intercepting rays comprising a line of the diffraction pattern of the crystalline material, determining the intensity of the line, and comparing its intensity with the intensity of a corresponding line from the uncoated crystalline material.

10. The method of measuring the thickness of a coating on a crystalline material comprising directing a beam of X-rays onto said coated material, intercepting and determining the intensity of a line of the diffraction pattern of the said crystalline material, comparing that line intensity with the intensity of a corresponding line from the uncoated crystalline material, and thus obtaining a measure of the coating thickness.

11. The method of measuring the thickness of a metallic coating on the surface of crystalline material from one side thereof which comprises directing a beam of X-rays onto the surface of the crystalline material, determining from the same side thereof the intensity of a line of the diffraction pattern of the said crystalline material, and comparing the intensity of that line with the intensity of the corresponding line from the uncoated crystalline material.

12. The method of measuring the thickness of foil comprising backing said foil with a crystalline material, directing a beam of X-rays onto said backed foil, intercepting and determining the intensity of a line of the diffraction pattern of the backing material, comparing the intensity thereof with the intensity of a corresponding line from the backing material alone, and thus obtaining a measure of the thickness of the foil.

13. The method of measuring the thickness of an electrodeposited metallic coating on a crystalline material from one side thereof comprising directing a beam of X-rays onto the coated surface and determining from the same side thereof the intensity of a line of the diffraction pattern of the said crystalline material, comparing the intensity of the said line with the intensity of a corresponding line from the uncoated material, and obtaining thereby a measure of the thickness of the deposit.

14. The method of measuring the thickness of a coating on a crystalline material comprising directing a beam of X-rays onto said coated surface, intercepting rays comprising a line of the diffraction pattern of the crystalline material and measuring the intensity thereof, comparing the intensity of said line with the intensity of a corresponding line obtained from the uncoated material, and thereby obtaining a measure of the coating thickness.

HERBERT FRIEDMAN.

REFERENCES CITED

The following references are of record in the file of this patent:

UNITED STATES PATENTS

| Number | Name | Date |
|---|---|---|
| 2,057,325 | Bouwers | Oct. 13, 1936 |
| 2,259,708 | Schiebold | Oct. 21, 1941 |
| 2,277,756 | Hare | Mar. 31, 1942 |
| 2,304,910 | Hare | Dec. 15, 1942 |
| 2,318,667 | Bruce | May 11, 1943 |